(No Model.)
H. G. OSBURN.
SECONDARY BATTERY ELECTRODE.
No. 490,753. Patented Jan. 31, 1893.
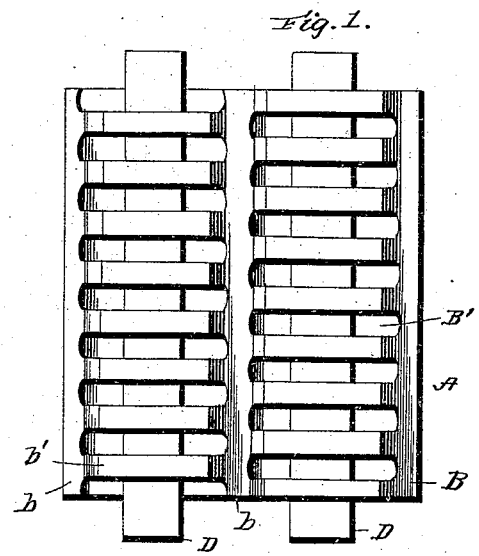
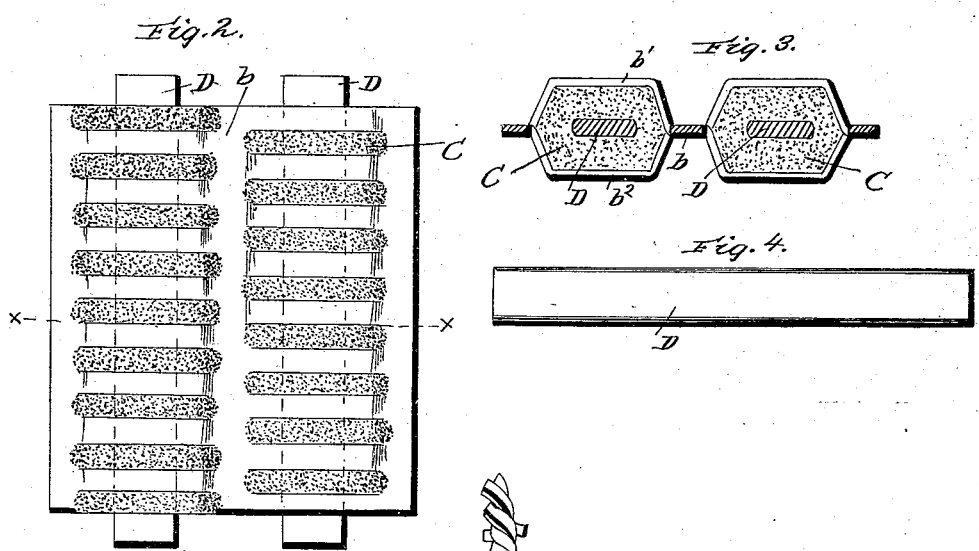
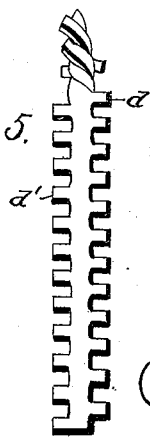
Witnesses:
Inventor
Harry G. Osburn
By James J. Sheehy
Attorney

UNITED STATES PATENT OFFICE.

HARRY G. OSBURN, OF CHICAGO, ILLINOIS.

SECONDARY-BATTERY ELECTRODE.

SPECIFICATION forming part of Letters Patent No. 490,753, dated January 31, 1893.

Application filed November 21, 1891. Serial No. 412,664. (No model.)

*To all whom it may concern:*

Be it known that I, HARRY G. OSBURN, a citizen of the United States, residing at Chicago, in the county of Cook and State of Illinois, have invented certain new and useful Improvements in Storage-Batteries; and I do declare the following to be a full, clear, and exact description of the invention, such as will enable others skilled in the art to which it appertains to make and use the same.

In another application filed by me bearing even date herewith, and serially numbered 412,663, I have disclosed a grid or plate for an electrode for secondary batteries, which comprises longitudinal webs and a multiplicity of transverse ribs or bars deflected in opposite directions in relation to the webs and forming a series of open receptacles for the reception and exposure of the active material of the battery, and I have also shown in an application filed by me April 7, 1891, Serial No. 387,921, a battery plate comprising a series of longitudinal parallel receptacles or cells having slots or openings and intermediate webs or ribs connecting the parallel receptacles so as to join the same and hold them separate and independent from each other, the webs being between the terminals of the slots in the cells.

In this my present invention I contemplate the combination with such a grid or plate as referred to, of vertical conducting strips or cores extending through the receptacles and the active material therein, the object being to afford greater strength and durability to the electrodes, to retain the active material more securely in place in the grid or plate, to increase the surface exposure of the active material to the action of the electrolyte, and to expedite and increase the discharge of the electric energy.

The accompanying drawings fully illustrate my present improvement in which:

Figure 1, is a view of the grid or plate with the reinforcing conducting strips therein, the active material being omitted to show the construction. Fig. 2, is a view of the electrode with the active material therein. Fig. 3, is a cross section in the line $x$, $x$, of Fig. 2. Fig. 4, is a detail of conducting strip. Fig. 5, is still another form of the conducting and reinforcing strip.

Like letters of reference denote corresponding parts in all the figures of the drawings.

A, designates the electrode which, as an entirety, comprises the plate or grid B, the filling C, of active material and the vertical conducting and reinforcing strips or cores D.

As hereinbefore mentioned I prefer to use the grid or plate shown and described in my concurrent application Serial No. 412,663, which consists essentially of the longitudinal webs $b$, $b$, and the transverse ribs or bars $b'$, $b^2$, integral with the webs and deflected in opposite directions to form the open slotted receptacles B', for the reception and exposure of the active material C, which is pressed or worked, while in a plastic or powdered form, into the receptacles and the slots or spaces in the same so that a large and increased surface exposure of the active material is secured. The vertical rods or bars extend centrally and longitudinally through the receptacles B', formed by the ribs or bars and around these rods or bars is molded the active material which adheres to the rods or bars and which thus serves to assist in holding or retaining the active material in place within the grid or plate and to reinforce and strengthen the plate. The core, as the rod or bar may be termed, is made to serve as a conductor as well as a reinforcer, and to this end it is made of substantially rigid metal, such for instance as lead which is less affected by the electrolyte than other metals.

In some cases the core of metal may be in the form shown in Fig. 5 in which I prefer to make it with protuberances or irregular projections formed by spirally twisting the bar or rod or notching the same to produce quite a large number of lugs or ribs $d'$, which are designed to take into the active material and to reinforce the same.

By the construction and arrangement of parts the electrode is very materially increased in strength and the weight is lessened as compared with an ordinary electrode or a cast lead electrode, all at the same time combining to produce an increased surface exposure of the active material to the action of the electrolyte and insure a heavy discharge of electric energy from the battery.

The electrode is cheap of manufacture, and it possesses the important advantage of retaining or holding the active material securely in place on and in the grid or plate even if the battery is subjected to jars as is the case in transporting it for illuminating and other purposes.

To secure the greatest strength and durability to an electrode contemplated by my invention, the grid or plate should be made of non-conducting material impervious to the electrolyte and current of electric energy, such as rubber or celluloid.

Having described my invention what I claim is:

An electrode for secondary batteries, comprising a grid or plate having a multiplicity of connected ribs or bars which are deflected in opposite directions, and form open receptacles for active material, a reinforcing conductor extending through the receptacles and the filling of active material substantially as specified.

In testimony whereof I affix my signature in presence of two witnesses.

HARRY G. OSBURN.

Witnesses:
WILMA M. ROE,
FRANK S. WOODS.